(12) United States Patent
Berggren

(10) Patent No.: US 9,277,506 B2
(45) Date of Patent: Mar. 1, 2016

(54) SOUNDING REFERENCE SIGNAL TRANSMISSION

(71) Applicant: HUAWEI TECHNOLOGIES CO., LTD., Shenzhen (CN)

(72) Inventor: Fredrik Berggren, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 14/242,025

(22) Filed: Apr. 1, 2014

(65) Prior Publication Data
US 2014/0211740 A1 Jul. 31, 2014

Related U.S. Application Data

(63) Continuation of application No. PCT/CN2011/080521, filed on Oct. 8, 2011.

(51) Int. Cl.
H04L 1/00 (2006.01)
H04W 52/18 (2009.01)
H04L 5/00 (2006.01)
H04W 72/04 (2009.01)

(52) U.S. Cl.
CPC ............. *H04W 52/18* (2013.01); *H04L 5/0007* (2013.01); *H04L 5/0048* (2013.01); *H04W 72/0413* (2013.01)

(58) Field of Classification Search
CPC ..... H04W 72/04; H04W 72/05; H04W 72/06; H04W 84/08; H04W 84/09; H04W 84/10; H04L 47/10; H04L 47/11; H04L 47/12; H04L 47/13; H04L 47/14
USPC .................. 370/229, 230, 235, 329, 330, 341
See application file for complete search history.

(56) References Cited

U.S. PATENT DOCUMENTS

| 2012/0076037 | A1 | 3/2012 | Noh et al. |
| 2012/0093119 | A1 | 4/2012 | Kim et al. |
| 2012/0300740 | A1 | 11/2012 | Iwai et al. |
| 2013/0039329 | A1 | 2/2013 | Matsumoto et al. |

FOREIGN PATENT DOCUMENTS

| CN | 101779512 | 7/2010 |
| CN | 101932108 | 12/2010 |
| EP | 2 239 989 A1 | 10/2010 |
| WO | 2010/131934 | 11/2010 |
| WO | 2010/147411 A2 | 12/2010 |
| WO | 2011/099283 | 8/2011 |

OTHER PUBLICATIONS

"R1-105270: Details of Dynamic Aperiodic SRS configuration", Document of *3GPP TSG RAN WG1 Meeting #62bis*, Oct. 11-15, 2010, 5 pp., Sharp, Xi'an, China.

(Continued)

*Primary Examiner* — Dady Chery
(74) *Attorney, Agent, or Firm* — Staas & Halsey LLP

(57) ABSTRACT

To facilitate transmission of a sounding reference signal (SRS) on an uplink carrier of a telecommunication system, a shifted SRS is created, wherein a predefined frequency domain position of a SRS is shifted for creation of the shifted SRS, thereby creating an extended SRS region including at least one additional RB being separate from the predefined frequency domain position of the SRS.

19 Claims, 3 Drawing Sheets

(56) References Cited

OTHER PUBLICATIONS

"R1-110626: Final details of SRS", Document of *3GPP TSG RAN WG1 meeting #64*, Feb. 21-25, 2011, 4 pp., Huawei and HiSilicon, Taipei, Taiwan.

"R1-110699: On Frequency Hopping for Aperiodic SRS Transmission", Document of *3GPP TSG RAN WG1 #64*, Feb. 21-25, 2011, 3 pp., Texas Instruments, Taipei, Taiwan.

"R1-114092: SRS on PUCCH-less carrier", Document of *3GPP TSG RAN WG1 meeting #67*, Nov. 14-18, 2011, 3 pp., Huawei and HiSilicon, San Francisco, USA.

"R1-120988: Enhancements of SRS for Rel-11", Document of *3GPP TSG RAN WG1 meeting #68bis*, Mar. 26-30, 2012, 3 pp., Huawei and HiSilicon, Jeju, Republic of Korea.

Extended European Search Report mailed Aug. 22, 2014, in corresponding European Patent Application No. 11873661.0.

International Search Report mailed Jul. 19, 2012 in corresponding International Patent Application No. PCT/CN2011/080521.

PCT International Search Report and Written Opinion of the International Searching Authority mailed Jul. 19, 2012 in corresponding International Patent Application No. PCT/CN2011/080521.

"SRS Bandwidth Selection", Nokia Siemens Networks, Nokia, 6.1.2, 3GPP TSG RAN WG1 Meeting #52bis, Shenzhen, China, Mar.-Apr. 2008, 8pp.

"Uplink channel sounding RS structure", Samsung, 7.11.2, 3GPP TSG RAN WG1 Meeting #49, Kobe, Japan, May 2007, 4pp.

"Frequency hopping arrangement for SRS", Nokia Siemens Networks, Nokia, 7.1.3, 3GPP TSG RAN WG1 Meeting #53, Kansas City, USA. May 2008, 4pp.

"PUCCH evaluation", Huawei, HiSilicon, 7.2, 3GPP TSG-RAN WG2 Meeting #74, Barcelona, Spain, May 2011, pp. 1-5.

"3$^{rd}$ Generation Partnership Project; Technical Specification Group Radio Access Network; Evolved Universal Terrestrial Radio Access (E-UTRA); Physical Channels and Modulation (Release 10)", 3GPP TS 36.211 V10.3.0, Sep. 2011, pp. 1-103.

"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.3.0, Sep. 2011, pp. 1-122.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.5.0, Sep. 2011, pp. 1-194.

SOUNDING REFERENCE SIGNAL TRANSMISSION

CROSS-REFERENCE TO RELATED APPLICATIONS

This application is a continuation of International Application No. PCT/CN2011/080521, filed on Oct. 8, 2011, which is hereby incorporated by reference in its entirety.

TECHNICAL FIELD

The present disclosure relates to the field of wireless network communications, and particularly to transmission of Sounding Reference Signals (SRSs) on an uplink carrier of a telecommunication system.

BACKGROUND

Data transmission is performed on a Physical Uplink Shared Channel(PUSCH). In order to be able to schedule the PUSCH, a base station (eNodeB) receives a Sounding Reference Signal (SRS) transmitted from a user equipment(UE). The SRS is used by the eNodeB, e.g. to estimate the uplink channel quality. The uplink channel quality is further used for determining the resource block (RB) allocation and for determining the applied modulation and coding scheme of the PUSCH transmission.

However, in LTE Rel-10 system, the SRS transmission scheme is designed based on the presence of a Physical Uplink Control Channel (PUCCH). In a case that the PUCCH is removed for a non-backwards compatible Uplink Secondary Component Carrier (UL SCC), proper and efficient scheduling decisions are difficult to make, since the SRS transmission has been optimized for a backwards compatible UL SCC having a different configuration. Due to these difficulties, a non-optimal scheduling happens, which does not make use of all available resources in the system.

SUMMARY

In accordance with one aspect of this disclosure, to facilitate transmission of a sounding reference signal (SRS) on an uplink carrier of a telecommunication system, a predefined frequency domain position of a first SRS from a set of SRSs is shifted for creation of a shifted SRS, thereby creating an extended SRS region including at least one additional RB being separate from the predefined frequency domain position of the first SRS.

In accordance with another aspect of this disclosure, to facilitate transmission of a sounding reference signal (SRS) on an uplink carrier of a telecommunication system, a configuration instruction is provided to an user equipment (UE) in the system, the configuration instruction relating to creating a shifted SRS.

In accordance with another aspect of this disclosure, a user equipment is provided. The user equipment includes a shift creating entity being arranged for creating a shifted SRS, and a transmission entity being arranged for transmitting the shifted SRS on a uplink carrier.

DETAILED DESCRIPTION

In a conventional telecommunication system, such as a LTE Rel-10 (LTE-Advanced) system, a terminal (e.g. a UE) can utilize carrier aggregation. For carrier aggregation, data can be simultaneously received on multiple downlink carriers and data can be simultaneously transmitted on several uplink carriers. According to the LTE Rel-10 standardization documentation, the notion of a cell is used to denote a combination of downlink resources, and optionally also a combination of uplink resources, where the linking between the carrier frequencies of the downlink resources and the carrier frequencies of the uplink resources is indicated in system information transmitted on the downlink resources. Hence, the meaning of a cell may not be the same as a geographical area as usually is the case for cellular communication systems.

In this document, the disclosure will be described in relation to, and using the notation of the LTE Rel-10 standard. However, the disclosure may, as is clear for a skilled person also be implemented in any telecommunication standard having corresponding capabilities as the LTE Rel-10 standard prescribes.

Typically, the UE is mostly confined to transmit and receive on a single cell. This cell is referred to as the Primary Cell (PCell). In the downlink, the carrier corresponding to the PCell is the Downlink Primary Component Carrier (DL PCC), while in the uplink, the carrier corresponding to the PCell is the Uplink Primary Component Carrier (UL PCC).

Depending on UE capabilities, Secondary Cells (SCells) can be configured to form, together with the PCell, a set of serving cells. In the downlink, the carrier corresponding to a SCell is a Downlink Secondary Component Carrier (DL SCC) while in the uplink it is an Uplink Secondary Component Carrier (UL SCC). The UE can then aggregate transmissions over multiple serving cells.

The Physical Downlink Control Channel (PDCCH) that includes the DL assignments for the SCell, or UL grants for the SCell, can be transmitted either on the DL SCC or on the DL PCC. The latter case is referred to as cross-carrier scheduling.

Figure 1:
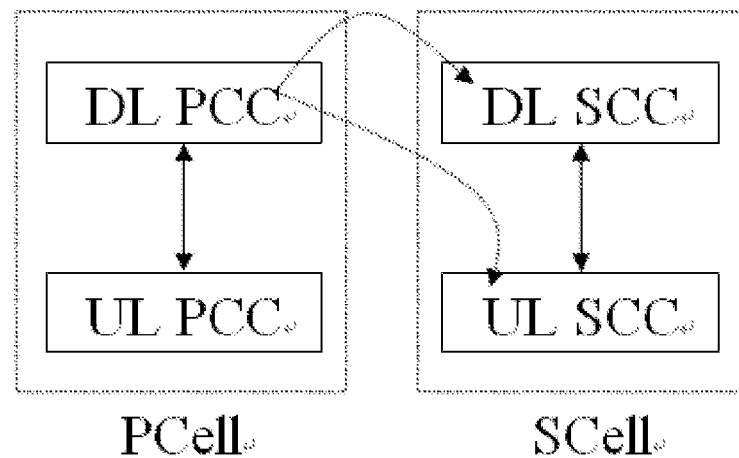
FIG. 1 shows carrier aggregation by cross scheduling.

FIG. 1 schematically illustrates the aggregation of two cells, where cross-carrier scheduling is made by a PDCCH located on the PCell. The linkage between an uplink carrier and downlink carrier in a cell is in Frequency Division Duplex (FDD) systems given by a fixed duplex distance. A UE that is configured with carrier aggregation may only transmit the Physical Uplink Control Channel (PUCCH) on its PCell, i.e. the UL PCC.

According to the LTE Rel-10 standard, the configuration of a PCell is UE-specific, i.e., a component carrier can be either part of a PCell or part of an SCell, depending on how it is configured for a given UE. In LTE Rel-10, all cells are backwards compatible and can be accessed by UEs of all previous system releases, even for UEs that do not support carrier aggregation.

Thus, even if the SCell is cross-carrier scheduled for a given UE, since the SCell is backwards compatible, the DL SCC includes a control region comprising at least 1 OFDM symbol, and spanning the whole carrier bandwidth. When the carrier bandwidth is 1.6 MHz, the control region comprises at least 2 OFDM symbols.

The PUCCH is transmitted on the outer Resource Blocks (RBs) on the UL PCC, and the number of RBs for the PUCCH may vary depending on system load. The PUCCH comprises HARQ feedback and Channel State Information (CSI) reporting. An RB is in LTE Rel-10 defined as a time-frequency resource comprising 0.5 ms and 180 kHz. In conventional disclosures, it has been shown that the number of RBs used for the PUCCH can be significant, depending on the periods configured for Channel Quality Indicator/Precoding Matrix Indicator/Rank Indicator (CQI/PMI/RI) reporting and Scheduling Request. RBs that are not used for the PUCCH could be used for data transmission on the Physical Uplink Shared Channel (PUSCH).

In conventional art, it has been proposed to introduce non-backwards compatible SCells, i.e. cells which cannot be accessed by UEs of previous system releases. One such example is a DL SCC which does not include any control region, i.e. does not include any PDCCH. It would therefore always have to be scheduled by cross-carrier scheduling from the PCell. One consequence is then that, due to the absence of a control region, this non-backwards compatible carrier cannot be configured as a PCell for any UE, since the standard does not allow cross-carrier scheduling to a PCell from a SCell. Hence, the associated UL SCC would never comprise a PUCCH, since only the PCell may contain a PUCCH.

It has therefore been envisaged that a non-backwards compatible carrier, not containing any PUCCH, will be needed if a non-backwards compatible DL SCC is introduced. Removal of the PUCCH could thereto be assumed to improve the efficiency since there is less control overhead and more RBs would be available for the PUSCH as a result from the removal.

In order to be able to schedule the PUSCH, a base station (eNodeB) receives a Sounding Reference Signal (SRS) transmitted from a UE. The SRS is used by the eNodeB, e.g. to estimate the uplink channel quality. The uplink channel quality is further used for determining the RB allocation and for determining the applied modulation and coding scheme of the PUSCH transmission.

However, in the LTE Rel-10 system, the SRS transmission scheme is designed based on the presence of a PUCCH. In a case that the PUCCH is removed for the non-backwards compatible UL SCC, proper and efficient scheduling decisions are difficult to make, since the SRS transmission has been optimized for a backwards compatible UL SCC having a different configuration. Due to these difficulties, a non-optimal scheduling happens, which does not make use of all available resources in the system.

An embodiment of the present disclosure relates to a method for transmission of Sounding Reference Signals (SRSs) on an uplink carrier of a telecommunication system, in which system:
  a set of SRSs is predefined, each predefined SRS being configured as having a bandwidth and a frequency domain position; and
  a predefined SRS region includes a set of all Resource Blocks (RBs) being usable for transmission of said predefined SRSs on said uplink carrier, said set of RBs being smaller than a total set of RBs being available on said uplink carrier.

Another embodiment of the present disclosure relates to a method of an eNodeB for configuration and reception of a transmission of SRSs on an uplink carrier of a telecommunication system, in which system:
  a set of SRSs is predefined, each predefined SRS being configured as having a bandwidth and a frequency domain position; and
    a predefined SRS region includes a set of all RBs being usable for transmission of said predefined SRSs on said uplink carrier, said set of RBs being smaller than a total set of RBs being available on said uplink carrier.

Another embodiment of the present disclosure relates to a User Equipment (UE) being arranged for performing transmission of SRSs on an uplink carrier of a telecommunication system, in which system:
  a set of SRSs is predefined, each predefined SRS being configured as having a bandwidth and a frequency domain position; and
  a predefined SRS region includes a set of all RBs being usable for transmission of said predefined SRSs on said uplink carrier, said set of RBs being smaller than a total set of RBs being available on said uplink carrier.

Another embodiment of the present disclosure relates to an eNodeB arranged for configuration and reception of a transmission of SRSs on an uplink carrier of a telecommunication system, in which system:
  a set of SRSs is predefined, each predefined SRS being configured as having a bandwidth and a frequency domain position; and
  a predefined SRS region includes a set of all RBs being usable for transmission of said predefined SRSs on said uplink carrier, said set of RBs being smaller than a total set of RBs being available on said uplink carrier.

Embodiments of the present disclosure also relates to a computer program and a computer program product implementing the above methods.

The present disclosure aims to provide a more efficient resource scheduling than the inferior scheduling known in conventional art.

To achieve the object, an embodiment in accordance with the above mentioned method comprises the steps of:
  creating at least one shifted SRS by shifting said predefined frequency domain position for at least one of said predefined SRSs, thereby creating an extended SRS region including at least one additional RB being separate from said predefined SRS region; and
  transmitting said at least one shifted SRS on said uplink carrier.

To achieve the object, an embodiment in accordance with the above mentioned method comprises the steps of:
  providing configuration instructions to an UE in said system, said instructions relating to at least one shifted SRS to be created by shifting said predefined frequency domain position for at least one of said predefined SRSs, thereby creating an extended SRS region including at least one additional RB being separate from said predefined SRS region; and
  receiving on said uplink carrier at least one shifted SRS.

To achieve the object, an embodiment in accordance with the above mentioned UE comprises:
  a shift creating entity, being arranged for creating at least one shifted SRS by shifting said predefined frequency domain position for at least one of said predefined SRSs, thereby creating an extended SRS region including at least one additional RB being separate from said predefined SRS region; and
  a transmission entity, being arranged for transmitting said at least one shifted SRS on said uplink carrier.

To achieve the object, an embodiment in accordance with the above mentioned eNodeB comprises:
  a configuration entity, arranged for providing configuration instructions to an UE in said system, said instructions relating to creation of at least one shifted SRS by shifting said predefined frequency domain position for at least one of said predefined SRSs, thereby creating an extended SRS region including at least one additional RB being separate from said predefined SRS region; and a reception entity, arranged for receiving said at least one shifted SRS on said uplink carrier.

The object is also achieved by the above mentioned computer and computer program implementing the methods.

In accordance with several embodiments of the methods, UEs and eNodeBs of the present disclosure, configuration, transmission and reception of SRSs are performed in such a way that an extended SRS region is created by performing shifts on the frequency domain position of one or more predefined SRS.

Hereby, SRSs can be transmitted on an increased number of RBs, whereby more RBs on the UL carrier can be sounded and thus utilized for proper scheduling.

Thus, since the SRS bandwidth in LTE is less than the bandwidth of the carrier, and the carrier must not comprise a PUCCH, a number of RBs are freed up to be possible to schedule. By utilization of the disclosure, these freed up RBs can be included in the extended SRS region, and can thus be sounded. This increases the bandwidth of the UL carrier that is usable for PUSCH transmissions. Removal of the PUCCH will therefore by the use of the disclosure, improve the spectral efficiency of the system.

More detailed exemplary embodiments and advantages of the SRS configuration, transmission and reception according to the disclosure are described with reference to the appended drawings.

In LTE Rel-10, physical resource blocks (RBs) in an uplink carrier are enumerated as $n_{PRB}=0,1,\ldots,N_{RB}^{UL}-1$. Each RB contains $N_{sc}^{RB}=12$ resource elements (REs) and the relation between the RB and resource element k is $n_{PRB}=\lfloor k/N_{sc}^{RB}\rfloor$. The resource elements are enumerated from $k=0,1,\ldots, N_{RB}^{UL}N_{sc}^{RB}-1$ and each resource element is in turn mapped to a subcarrier.

6 bandwidths are predefined in LTE, corresponding to $N_{RB}^{UL}$=6, 15, 25, 50, 75 and 100 RBs.

The number of RBs that can be scheduled on the PUSCH for any UE is further constrained to fulfill $M_{RB}^{PUSCH}=2^{\alpha_2}\cdot 3^{\alpha_3}\cdot 5^{\alpha_5}\le N_{RB}^{UL}$ where $\alpha_2$, $\alpha_3$, $\alpha_5$ is a set of non-negative integers.

The bandwidth of the predefined SRS is configured to comprise $m_{SRS,b}$ RBs. The bandwidth of the SRS is constrained to $m_{SRS,b}=2^{(1+\alpha_2)}\cdot 3^{\alpha_3}\cdot 5^{\alpha_5}\le N_{RB}^{UL}$ where $\alpha_2$, $\alpha_3$, $\alpha_5$ is a set of non-negative integers. Table 1 is one example of possible predefined SRS bandwidths in LTE Rel-10. The predefined SRS bandwidth configuration $C_{SRS}$ in table 1 is a cell-specific parameter configured by higher layers and the SRS bandwidth configuration $B_{SRS}$ in table 1 is a UE-specific parameter configured by higher layers.

Table 1 shows an example of an SRS configuration for the uplink bandwidth of $80<N_{RB}^{UL}\le110$, for $M_{SRS,b}$ and $N_b$, where b=0, 1, 2, 3. Different SRS bandwidths can be configured, e.g. a wideband SRS ($m_{SRS,0}$) or one of several narrowband SRSs ($m_{SRS,1}$, $m_{SRS,2}$, $m_{SRS,3}$). The narrowband SRSs will be transmitted with higher power per RE and are beneficial when the UE is power-limited. To cover the whole system bandwidth, frequency hopping (FH) can be used for the narrowband SRSs, thereby covering the same RBs as the wideband SRS. Depending on the system bandwidth and expected number of RBs for PUCCH, a suitable SRS bandwidth configuration should be selected.

TABLE 1

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

LTE-Advanced supports spatial multiplexing on the uplink, for which transmission is performed on up to 4 antenna ports. One SRS is transmitted per antenna port. The resource elements (REs) on antenna port p predefined to be used for SRS are modulated by an SRS sequence according to:

$$a^{(p)}_{2k+k_0^{(p)}} = Ke^{j2\pi k'\frac{n_{CS}(p)}{8}}\bar{r}_{u,v}(k'),\quad (Eq.1)$$

$$k'=0,1,\ldots,\frac{m_{SRS,b}N_{sc}^{RB}}{2}-1,$$

where K is a constant, u and v are integers, $n_{CS}\in\{0,1,\ldots,7\}$ is a configurable cyclic shift, and $\bar{r}_{u,v}(k)$ is a complex valued sequence with constant magnitude. A (discrete) time-domain signal is obtained by a (discrete) Fourier transform of the sequences.

The predefined frequency domain position for the SRS, which can be seen as a starting position for the SRS, i.e., the resource element index corresponding to the first RE of the SRS in the frequency domain, is obtained when $k=0$ and is defined by:

$$k_0^{(p)}=\bar{k}_0^{(p)}+\Sigma_{b=0}^{B_{SRS}}m_{SRS,b}N_{sc}^{RB}n_b, \quad (Eq.\ 2)$$

where for normal uplink subframes, $\bar{k}_0^{(p)}$ is defined by:

$$\bar{k}_0^{(p)}=(\lfloor N_{RB}^{UL}/2\rfloor-m_{SRS,0}/2)N_{sc}^{RB}+k_{TC}^{(p)}. \quad (Eq.\ 3)$$

The parameter $k_{TC}^{(p)}\in\{0,1\}$ is UE-specific and is implicitly configured by higher layers.

The starting position defined in Eq. 2 can be obtained from a tree based design in order to simplify orthogonal multiplexing of SRS of different bandwidths from different UEs. The tree property can be realized in table 1, where $m_{SRS,i}=N_{i+1}m_{SRS,i+1}$. This means that for a given configuration $C_{SRS}$, the frequency domain positions, i.e., the location of the RBs, for the SRS of different UEs, either completely overlap, or do not overlap at all. Partial overlapping can be avoided in LTE Rel-10, which in turn guarantees that SRS can remain orthogonal among UEs.

If frequency hopping of the SRS is not configured, the frequency domain position, i.e. the RE index, remains constant and is obtained by using:

$$n_b = \left\lfloor\frac{4n_{RRC}}{m_{SRS,b}}\right\rfloor \mod N_b, \quad (Eq.\ 4)$$

where $n_{RRC}\in\{0,1,\ldots,23\}$ is a UE-specific parameter configured by higher layers.

If frequency hopping is enabled, the parameter $b_{hop} \in \{0, 1, 2, 3\}$ is configured and $$n_b = \begin{cases} \lfloor 4n_{RRC}/m_{SRS,b}\rfloor \bmod N_b, & b \leq b_{hop} \\ (F_b(n_{SRS}) + \lfloor 4n_{RRC}/m_{SRS,b}\rfloor) \bmod N_b, & \text{otherwise.} \end{cases} \quad \text{(Eq. 5)}$$

Here, $F_b(n_{SRS})$ is a time-dependent hopping sequence.

The LTE-Advanced system thus comprises a set of predefined SRSs which can have configurable bandwidths and frequency domain positions through a set of parameters $C_{SRS}$, $B_{SRS}$, $b_{hop}$, $k_{TC}^{(p)}$ and $n_{RRC}$. In addition, SRS properties pertaining to the time-domain are also configurable.

Orthogonality among SRSs transmitted in a same RB can in LTE Rel-10 be obtained by transmission on mutually disjoint sets of subcarriers. This is possible since the SRS sequence only modulates every second subcarrier (Eq. 1) and this can be controlled by the parameter $k_{TC}^{(p)}$. Hence, orthogonal multiplexing can be achieved even if UEs are configured with different SRS bandwidths $m_{SRS,b}$, by using different values of $k_{TC}^{(p)}$.

When the SRS bandwidths $m_{SRS,b}$ are the same (and they use the same value of $k_{TC}^{(p)}$)), orthogonal SRSs can also be obtained using different cyclic shifts $n_{CS}$ for a given sequence $\bar{r}_{u,v}(k)$. For a positive integer q, when the sequence length is q·8, the cross-correlation in the frequency domain between two sequences of same length using different cyclic shifts is:

$$\sum_{k=0}^{q\cdot 8-1} e^{j2\pi k \frac{n_{CS,0}}{8}} \bar{r}_{u,v}[k] e^{-j2\pi k \frac{n_{CS,1}}{8}} \bar{r}_{u,v}^*[k] = \quad \text{(Eq. 6)}$$

$$\sum_{k=0}^{q\cdot 8-1} e^{\frac{j2\pi k}{q\cdot 8} q(n_{CS,0}-n_{CS,1})} = 0,$$

Since the SRS sequence occupies 6 REs per RB, q=3 yields the smallest sequence length, corresponding to 4 RBs, over which SRS sequences can become orthogonal.

The condition of orthogonality can also be understood from considering the time-domain, by that the sequence length should be a multiple of 8 in order to accommodate 8 non-overlapping cyclically shifted signals. All SRS bandwidth are multiples of 4 RBs in LTE, as can be seen in table 1. This implies that there can be no SRS bandwidth equal to $N_{RB}^{UL}$=6, 15, 25, 50 and 75 RBs.

Orthogonality among SRSs for different antenna ports can be obtained by cyclic shifts only, or by cyclic shifts and different transmission combs.

As a non-limiting example, if we consider Eq. 3, when $k_{TC}^{(p)}$=0 and $N_{RB}^{UL}$=100, the lowest starting RB, i.e. the lowest frequency domain position, for the SRS becomes $n^-=\lfloor \min \bar{k}_0^{(p)}/N_{sc}^{RB}\rfloor$=2, by assuming that $m_{SRS,0}$=96 in table 1. Hence, the RBs $n_{PRB}$=0,1,98,99 cannot be used for SRS transmission in this example.

Since $C_{SRS}$ is a cell-specific configuration, these RBs can also not be used for SRS transmission by any UE in the cell. In LTE Rel-10, this would not be an issue since those RBs close to the edge of a total set of RBs being available on said uplink carrier would typically be used for the PUCCH and thus not need to be sounded by transmission of SRSs.

Thus, in the LTE Rel-10 system, the SRS transmission scheme is designed based on the presence of a PUCCH and the SRSs do not need to be transmitted on RBs usable for the PUCCH. However, if there is no PUCCH, these RBs could potentially be used by the PUSCH and not being able to sound the RBs becomes a problem. But, it may not be possible to transmit the SRS on the extra RBs coming from the removed PUCCH, which would make it difficult to make proper scheduling decisions on those RBs. It is a problem if the extra RBs cannot be used, since that would diminish the aforementioned efficiency improvements.

This can also be seen in table 2, which includes the lowest starting RB, $n^-=\lfloor \min \bar{k}_0^{(p)}/N_{sc}^{RB}\rfloor$, and the largest starting RB, $n^+=\lfloor \max \bar{k}_0^{(p)}/N_{sc}^{RB}\rfloor$, for each SRS configuration in table 1. In other words, table 2 shows how the different predefined SRS bandwidths can be positioned. From Table 2, it can be seen that the number of RBs that cannot be sounded ranges from 4 ($C_{SRS}$=0) to 52 ($C_{SRS}$=7), when $N_{RB}^{UL}$=100, which clearly indicates poor utilization of available transmission resources due to inferior scheduling possibilities.

TABLE 2

| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| $C_{SRS}$ | $n^-$ | $n^+$ | $n^-$ | $n^+$ | $n^-$ | $n^+$ | $n^-$ | $n^+$ |
| 0 | 2 | 2 | 2 | 50 | 2 | 74 | 2 | 94 |
| 1 | 2 | 2 | 2 | 66 | 2 | 82 | 2 | 94 |
| 2 | 10 | 10 | 10 | 50 | 10 | 70 | 10 | 86 |
| 3 | 14 | 14 | 14 | 62 | 14 | 74 | 14 | 82 |
| 4 | 18 | 18 | 18 | 50 | 18 | 66 | 18 | 78 |
| 5 | 20 | 20 | 20 | 60 | 20 | 76 | 20 | 76 |
| 6 | 26 | 26 | 26 | 50 | 26 | 62 | 26 | 70 |
| 7 | 26 | 26 | 26 | 58 | 26 | 66 | 26 | 70 |

In table 2, it can be observed that $n^- + m_{SRS,0} + n^{-+} = 100$ when $B_{SRS}$=0. Hence, the SRS is located on RBs symmetrically in the carrier. By inspection of Eq. 3, it is realized that when $N_{RB}^{UL}$ is an odd number, $n^- = (N_{RB}^{UL}-1)/2 - m_{SRS,0}/2$ and the number of RBs being located on RBs higher than for the SRS is $N_{RB}^{UL} - m_{SRS,0} - n^- = n^{-+1}$, which is 1 more RB than being located on RBs lower than for the SRS.

However, as described above, in the LTE Rel-10 system, the SRS transmission scheme is designed based on the presence of a PUCCH. In LTE Rel-10, the SRS bandwidth is less than the bandwidth of the carrier. This becomes an issue if the carrier does not comprise a PUCCH since not all RBs that would be usable for PUSCH transmissions can then be sounded.

Hence, in LTE Rel-10, it may not be possible to transmit the SRSs on the extra RBs resulting from the removed PUCCH, i.e. the freed up RBs previously having been used for transmission of the PUCCH, which would make it difficult to make proper scheduling decisions on those RBs. Thereby, the aforementioned efficiency improvements are diminished, since the extra RBs cannot be properly used.

The present disclosure discloses a method, a UE, and an eNodeB related to and arranged for SRS transmission in a telecommunication system on an UL carrier that does not contain a PUCCH, which will solve the above stated problems.

According to an aspect of the disclosure a set of SRSs is predefined, each predefined SRS being configured as having a bandwidth and a frequency domain position. One example of such predefined set of SRSs was described above in table 1. Thus, the predefined set of SRSs typically is the set defined in the Evolved Universal Terrestrial Radio Access (E-UTRA) LTE Rel-10. This predefined set of SRSs covers a predefined SRS region, where the SRS region includes a set of all RBs that could be used when these SRSs are transmitted on the uplink carrier.

As was described above, the SRS bandwidth is less than the bandwidth of the UL carrier, i.e. the set of RBs of the SRS region is here smaller than a total set of RBs being available on the UL carrier.

According to the disclosure, at least one shifted SRS is created. The shifted SRS is created by shifting the predefined frequency domain position for at least one of the predefined SRSs such that it utilizes an RB not being covered by that SRS (or any other of the existing predefined SRSs) before the shift has been made. Thus, at least one SRS typically being defined in LTE Rel-10 is shifted, whereby (a non-empty set of REs in) an additional RB is utilized for transmitting the shifted SRS.

By this shifting operation, an extended SRS region is created, which includes this at least one additional RB. Thus, the extended SRS region includes at least one additional RB being separate from, i.e. not being included in, the predefined SRS region. In other words, the SRS region being predefined for LTE Rel-10 is by the shift of at least one SRS extended by at least one additional RB not being covered in the SRS region being predefined for LTE Rel-10, thereby creating the extended SRS region.

The extended SRS region is then utilized for transmission of the least one shifted SRS on the UL carrier. As a result, at least one additional RB will be sounded by the transmission, which means that at least one additional RB will be useable for high quality data transmission. Thus, by creation of this extended SRS region, more RBs become usable for PUSCH transmissions, since the freed RBs previously being used for transmission of the PUCCH, can now be sounded and can thus be properly utilized for data transmission. The transmission of the at least one shifted SRS can here be performed in normal uplink subframes.

An advantage of the shifting operation is that SRSs could be transmitted over all RBs in the carrier, even if the total number of RBs in the carrier is not a multiple of 4, i.e., the SRS bandwidth multiple.

A further advantage of the disclosure is that it reuses the SRS sequences from conventional LTE-Advanced system, thereby keeping the complexity down both at the transmitter and receiver.

According to an embodiment of the disclosure, one or more predetermined SRS having a maximal bandwidth are shifted in order to create the extended SRS region. Here, a number of RBs $m_{SRS,0}=N_{RB}^{UL}-\Delta$ being used for transmission of such a predefined maximal bandwidth SRS is a number $\Delta$ of less RBs than a number of RBs $N_{RB}^{UL}$ included in the total set of RBs being available on the UL carrier, where the number $\Delta$ is an positive integer larger than zero, $\Delta>0$. Thus, the total UL bandwidth is $N_{RB}^{UL}$, and the SRS bandwidth is $m_{SRS,0}=N_{RB}^{UL}-\Delta$, which is $\Delta$ RBs less than the UL bandwidth $N_{RB}^{UL}$.

According to the embodiment, a definition is made of up to a number $\Delta+1$ of different frequency domain positions $n_{START}=0,1,\ldots,\Delta$ for at least one shifted SRS. These $\Delta+1$ different frequency domain positions are defined such that they include all feasible frequency domain positions on the UL carrier.

The different defined frequency domain positions could, e.g., be enumerated as $n_{START}=0,1,\ldots,\Delta$. One or more of the number $\Delta+1$ of different frequency domain positions $n_{START}=0,1,\ldots,\Delta$ are then utilized for transmission of the at least one shifted SRS.

By this embodiment, SRS transmission, which also makes sounding possible, is achieved for a telecommunication system, in which the number of RBs available for data transmission is larger than the maximum SRS bandwidth. In particular it applies to an UL carrier that does not contain a control channel (PUCCH).

According to an embodiment of the disclosure, the inclusion of all feasible frequency domain positions results in an extended SRS region including every one of the number $\Delta$ of RBs being unused for transmission of the predefined SRS having said maximal bandwidth. Thus, the entire UL carrier bandwidth can be utilized for transmission of the SRSs.

Figure 2:
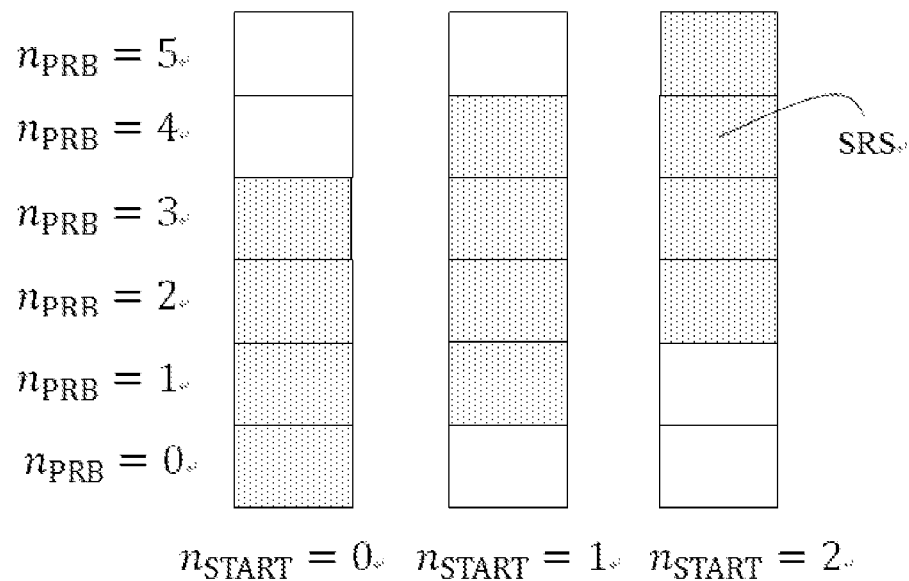
FIG. 2 shows one embodiment of the disclosure.

This is illustrated by FIG. 2, in which a non-limiting example of this embodiment, where $m_{SRS,0}=4$, $N_{RB}^{UL}=6$, $\Delta=2$, is shown. In FIG. 2, the frequency domain position $n_{START}=1$ illustrates the predefined frequency domain position of the maximal bandwidth SRS, i.e. the only frequency domain position being defined in LTE Rel-10. It is clearly shown in FIG. 2 that the edge RBs, i.e. $n_{PRB}=0$ and $n_{PRB}=5$, are not included in the SRS region, and would thus not be sounded when the predefined set of SRSs would be transmitted.

By use of this embodiment of the disclosure, the maximal bandwidth SRS is shifted such that the extended SRS region, i.e. the one or more shifted SRSs also covers the edge RBs $n_{PRB}=0$ and $n_{PRB}=5$, as is illustrated by the frequency bandwidth positions $n_{START}=0$ and $n_{START}=2$.

Thus, by allowing multiple frequency domain positions according to the disclosure, i.e. by utilizing shifted SRSs, it is possible to transmit SRSs, and thus to sound, the entire UL carrier bandwidth.

In this document, the notion of frequency domain position has been illustrated by using a granularity of RB. It is understood that the disclosure also includes other suitable definitions of the frequency domain position, e.g. where the frequency domain position refers to a resource element (RE), i.e., a subcarrier. For example, two SRS may then have the same frequency domain position RBs while having different frequency domain position REs within those RBs, e.g., by using different transmission combs ($k_{TC}^{(p)}$).

A consequence of using shifted SRSs, i.e. of using different frequency domain positions for the SRSs, is that SRSs may sometimes be partially overlapping. This would be the case in FIG. 2, if one UE is assuming $n_{START}=0$ and another UE is assuming $n_{START}=2$. An overlap could depend on the bandwidths of the shifted SRSs and, in case of frequency hopping, also the subframe number. If partial overlapping occurs, it implies that orthogonality may not be maintained even if the shifted SRSs have the same bandwidth. This problem does not preclude using shifted SRSs having different frequency domain positions, but the consequence of the loss of orthogonality may be a slight worse performance.

This orthogonality problem can, according to an embodiment of the disclosure, be solved by using two mutually disjoint sets of REs are usable for at least one frequency domain position of the at least one shifted SRS. This is possible since each RB includes a predefined number of REs. In LTE Rel-10, each RB includes 12 REs. Hereby, the orthogonality can be restored for the shifted SRSs of the extended SRS region, even if the shifts result in SRSs having partial overlaps.

The two mutually disjoint sets can be achieved by utilizing odd and even REs, respectively, for the two shifted SRSs. Thus, different transmission combs, i.e. odd and even REs, respectively, can be used within the extended SRS region in order to create mutually disjoint, and thereby orthogonal, sets.

The two mutually disjoint sets can also be achieved by utilizing Time Division Multiplexing (TDM), i.e. by transmission of the shifted SRSs with partially overlapping frequency resources in different subframes, whereby orthognality for the shifted SRSs is achieved. This, embodiment utilizes that different subframe offsets can be configured for different UEs in the LTE Rel-10 system.

According to an embodiment of the disclosure, two different frequency domain positions are usable for the at least one shifted SRS, where the two different frequency domain positions result in two different mutually disjoint sets of REs. This is possible since each RB includes a predefined number of REs, as stated above.

Thus, two different frequency domain positions are facilitated, e.g., $n_{START}=0$ and $\Delta$, which are associated with two different disjoint RE sets, which restores orthogonality for the shifted SRSs.

The disclosure also includes a method for creating the extended SRS region when at least one SRS having a smaller bandwidth, i.e. at least one of $m_{SRS,1}$, $m_{SRS,2}$, $m_{SRS,3}$ (i.e. non-wideband SRSs), is shifted. According to this embodiment, the extended SRS region is then created by at least one shifted SRS having a bandwidth being smaller than a maximal bandwidth predefined for SRS in the system. Thus, at least one of the predefined SRSs $m_{SRS,1}$, $m_{SRS,2}$, $m_{SRS,3}$ having a smaller bandwidth is shifted by altering its predefined frequency domain position.

Thus, the frequency domain positions are here only changed for predefined non-wideband SRS bandwidths, i.e. $m_{SRS,1}$, $m_{SRS,2}$, $m_{SRS,3}$. The frequency domain positions are shifted for the shifted SRSs such that one or more RBs not being within the sounding bandwidths of either the shifted non-wideband SRSs $m_{SRS,1}$, $m_{SRS,2}$, $m_{SRS,3}$, is within the sounding bandwidth of the maximal bandwidth SRS $m_{SRS,0}$, and vice versa. Thereby, the extended SRS region includes at least one additional RB not being included in the predefined SRS region.

According to an embodiment, the extended SRS region here typically includes one non-shifted predefined maximal bandwidth SRS and at least one shifted non-maximal bandwidth SRS.

According to an embodiment of the disclosure, the extended SRS region covers, after at least one shifted SRS has been created, at least one RB being aligned with an edge RB of the total set of RBs being available on the UL carrier.

According to an embodiment of the disclosure, the extended SRS region covers, after at least two shifted SRSs have been created, two shifted SRSs being aligned with a first and a last RB, respectively, of the total set of RBs being available on the UL carrier.

Thus, by use of these embodiments, the one or more of the edge RBs can be sounded, i.e. can be included in the extended SRS region, by shifting of SRSs having non-maximal bandwidths $m_{SRS,1}$, $m_{SRS,2}$, $m_{SRS,3}$, while remaining RBs can be sounded by the predefined maximal bandwidth SRS $m_{SRS,0}$. These embodiments also assure orthogonality, since the shifted versions of non-maximal SRS bandwidths $m_{SRS,1}$, $m_{SRS,2}$, $m_{SRS,3}$ are not partially overlap.

Figure 3:
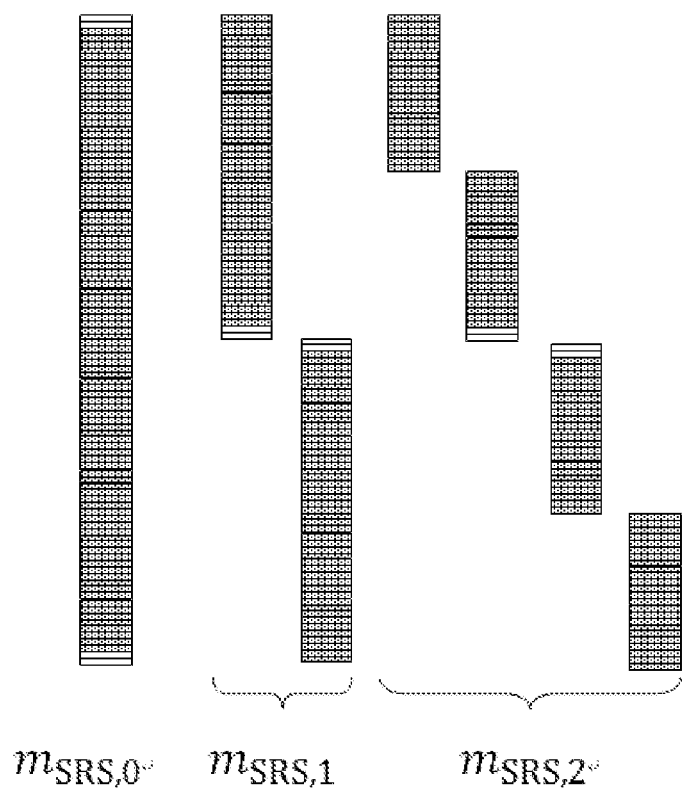
FIG. 3 shows one embodiment of the disclosure.

This embodiment is shown in a non-limiting example in FIG. 3 for $m_{SRS,0}=96$, $m_{SRS,1}=48$ and $m_{SRS,2}=24$, where $N_{RB}^{UL}=100$. The wideband SRS ($m_{SRS,0}=96$) is transmitted on RBs 2-97. For the shifted versions of the narrow-band SRSs ($m_{SRS,1}=48$ and $m_{SRS,2}=24$), the frequency domain positions after shifting are made such that RBs 48-51 are not used. From FIG. 3, it is clear that the extended SRS region includes RBs 0, 1, 98 and 99, that were not included in the SRS region, and would therefore never had been sounded without the use of the concept of shifted SRSs according to this disclosure.

The method is not limited to excluding RBs from the center of the carrier from being used by narrow-band SRSs. The only requirement is that the excluded RBs will be in the sounding bandwidth of the wide-band SRS, such that a continuous extended SRS region can result.

An advantage of this embodiment, i.e. shifting of non-wideband SRSs, is also that no signaling is needed for indicating the frequency domain positions of the shifted narrow-band SRSs. For example, since the carrier bandwidth is known, the frequency domain positions of the narrow-band SRS can be aligned with the first and last RB of the carrier, as illustrated in FIG. 3.

If the use of shifted narrow-band SRS is combined with frequency hopping, the excluded RBs may also not be used. An embodiment shown in FIG. 3 implies that the set of RBs used for transmitting frequency hopping SRS are RBs 0-47 and 52-99, i.e., in total 96 RBs. This also assures the shifted SRSs are not partially overlapping within the cell.

The frequency domain positions of the shifted narrow-band SRSs are according to an embodiment arranged such that $N_i$ shifted SRSs of bandwidth $m_{SRS,i}$, do not overlap in frequency. For example, the $N_1=2$ frequency domain positions make sure the shifted SRS of bandwidth $m_{SRS,1}$ do not overlap, as illustrated in FIG. 3. Also, the $N_2=4$ frequency domain positions make sure that the shifted SRS of of bandwidth $m_{SRS,2}$ do not overlap, etc. This condition is trivially fulfilled for the SRS of bandwidth $m_{SRS,0}$ since $N_0=1$ and there can be no overlap.

According to an embodiment of the disclosure, the extended SRS region, i.e. the at least one shifted SRS includes at least one narrow-band SRS as well as a maximal bandwidth SRS. Here, the creation of at least one shifted SRS is performed by shifting the predefined frequency domain position for at least one of the predefined narrow-band SRSs and for the maximal bandwidth SRS, respectively.

Information regarding the shifting of the predefined SRSs, i.e. the creation of the extended SRS region by altering the frequency domain positions for the predefined SRSs according to the above described methods, need to be conveyed to the UE, so that the UE knows how to create the extended SRS region, i.e. how to perform these shifts.

According to an embodiment of the disclosure, information related to at least one frequency domain position being used for creating at least one shifted SRS is implicitly provided to the UE. This has an advantage in that no extra signaling is needed to convey this information A predefined rule can, according to an embodiment, be utilized for providing such information implicitly. For example, the frequency domain position can be implicitly derived by the UE from an enumeration of a subframe, say t, in which the shifted SRS is transmitted, or any other predefined subframe or subframe pattern, e.g., as $n_{START}=t \bmod \Delta$. Related pre-defined rules for associating the transmission comb could, e.g., be a function of the frequency domain position $n_{START}$.

A predefined pattern of frequency domain positions can, according to an embodiment, be utilized for providing such information implicitly. For example, the shifts on the frequency domain positions can be made cyclically, such that each shifted SRS covers a new set of RBs, e.g. the predefined pattern can be defined such that the UE cycles through (all or a subset of) the $\Delta+1$ different possible frequency domain positions in different subframes. This has an advantage in the signaling can be minimized.

A system configuration can, according to an embodiment, be utilized for providing such information implicitly. Here, different system configurations are assigned to utilize different frequency domain positions. For example in the conventional LTE Rel-10 system, table 1 shows that there are several configurations of $C_{SRS}$ which apply the same value of $m_{SRS,0}$. Different configurations relating to the same value $m_{SRS,0}$ could thus be related to different frequency domain positions in a pre-defined manner. This could be achieved by either assuming the existing configurations $C_{SRS}$ in the system and associating a configuration with a starting position $n_{START}$, or new configurations could be added; $C_{SRS}$>7.

It is also understood by a person skilled in the art, that the disclosure also applies and can be implemented if the SRS bandwidth configurations $C_{SRS}$ will be provided by UE-specific signaling in any future system release.

According to an embodiment of the disclosure, at least one frequency domain position being used for creating at least one shifted SRS according to the above described methods is explicitly provided to a UE by a signaled parameter. This has an advantage in that an eNodeB thereby gets a larger freedom in arranging the frequency domain positions since the information relating to the frequency domain position is signaled by an independent parameter.

To explicitly provide a UE this information could, according to an embodiment, be achieved by signaling an integer-valued non-negative parameter $x^{(p)}$ such that:

$$\bar{k}_0^{(p)} = (\lfloor N_{RB}^{UL}/2 \rfloor - m_{SRS,0}/2)N_{sc}^{RB} + k_{TC}^{(p)} + (x^{(p)} - A)N_{sc}^{RB}, \quad \text{(Eq. 7)}$$

where A may be a suitable chosen integer such that a positive and/or negative shift may be obtained. In one example, the same value for the parameter $x^{(p)}$ is used for all antenna ports. An integer-valued non-negative parameter can, according to an embodiment of the disclosure, be provided by Radio Resource Control (RRC) layer signaling.

Thus, if 2 bits are used to encode $x^{(p)}$, 4 different frequency domain positions could be arranged. The parameter $x^{(p)}$ could be independent of $k_{TC}^{(p)}$, thereby letting the eNodeB have full freedom to allocate transmission comb and starting position $n_{START}$ independently.

The explicitly signaled parameter can, according to different embodiments, be an integer valued positive parameter being either UE specific or cell specific.

If the parameter is configured to be UE-specific, it is possible to assign different SRS positions to the UEs in a cell. The eNodeB may thus assure that all RBs in the carrier may be sounded, although a single UE will not sound all RBs in the carrier.

If the parameter is configured to be cell-specific, this configuration then results in that less signaling is needed compared to a UE-specific configuration. Although it implies that certain RBs will not be sounded in a cell, it has the advantage that the SRS interference between cells could be reduced by allocating different SRS frequency domain positions to different cells. This will improve the performance of the system as better scheduling and link adaptation can be expected. Furthermore, since all UEs apply the same shift in the cell, there will be no partial overlap of shifted SRSs and full orthogonality can be guaranteed.

According to an embodiment of the disclosure, The explicitly signaled parameters can be signaled in a Physical Downlink Control Channel (PDCCH). In the conventional LTE Rel-10 system, SRS transmission can be triggered by explicit bits contained in DL assignments or UL grants carried in the PDCCH. This is referred to as trigger type 1 in LTE Rel-10, i.e., aperiodic SRS transmission.

According to an embodiment of the disclosure, additional bits are introduced in the PDCCH to indicate further information of the frequency domain positions of the shifted SRSs. With 2 such bits, 4 different frequency domain positions can be indicated, which is sufficient for the applying the creation of the extended SRS region, i.e. to applying the disclosure, to a conventional LTE Rel-10 system.

However, additional bits increase the control overhead in the system. Therefore, a number of embodiments of the disclosure relates to signaling not increasing the control overhead in the PDCCH.

According to an embodiment, existing bits in the PDCCH are reused to indicate further information of the frequency domain positions of shifted SRSs. For example, for PDCCH DCI Format 4, 2 bits comprises a SRS request field and are used to trigger SRS transmissions. There are also other DCI formats containing 1 bit SRS request field. Table 3 shows an example of the interpretation of the trigger bits. Thus the trigger bits determine which one of the 3 SRS configurations that should be applied.

TABLE 3

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

Here, information regarding the frequency domain position of the SRSs could be encoded by reducing the number of SRS parameter sets. For example, if only the 1$^{st}$ SRS parameter set is assumed, the values '10' and '11' could encode additional information relating to frequency domain positions $n_{START}$ for the 1$^{st}$ SRS parameter set.

To explicitly provide the UE this information could, according to another embodiment of the disclosure, be achieved by utilizing signaling that reuses already existing bits in the PDCCH.

The selection of an RE set used within the extended SRS region, i.e. the selection of transmission comb, only corresponds to 1 bit of information. In a conventional LTE Rel-10 system, the transmission comb is signaled through a parameter $\bar{k}_{TC} \in \{0,1\}$, and the offset $\bar{k}_0^{(p)}$ is a function of $\bar{k}_{TC}$. Thus, the bit conveyed by $\bar{k}_{TC}$ can be reused and be associated to a frequency domain position $n_{START}$.

For example, if $n_{START}=0$ is used when $k_{TC}^{(p)}=0$ and $n_{START}=\Delta$ when $k_{TC}^{(p)}=1$, the following expression applies:

$$\bar{k}_0^{(p)} = ((N_{RB}^{UL} - m_{SRS,0})N_{sc}^{RB} + k_{TC}^{(p)})k_{TC}^{(p)}. \quad \text{(Eq. 8)}$$

According to an embodiment of the disclosure, the independent parameter being utilized for explicit signaling makes use of unused code points in the PDCCH for encoding of the parameter. Thus, no additional bits are here introduced in the PDCCH but unused code-points in the PDCCH are reused for encoding frequency domain positions for the shifted SRSs.

The reuse of the unused code-points can be achieved by either restricting a usage of at least one field in the PDCCH, or performing a higher layer configuration of at least one field in the PDCCH.

If SRS is triggered by the PDCCH, functionality provided by some information fields may be discarded. For example, in LTE Rel-10, there is 1 bit in DCI Format 4 that determines the resource allocation type (single-cluster or multi-cluster) for the PUSCH. If the resource allocation is constrained to either type when the SRS request field is non-zero, the resource allocation bit could be used for encoding frequency domain positions of shifted SRS instead. That is, restriction of the usage of at least one field in the PDCCH is used for encoding frequency domain positions for the shifted SRSs.

If SRS is triggered by the PDCCH, functionality provided by some information fields may be provided by higher layers, e.g., MAC or RRC signaling. For example, in LTE Rel-10, there is 1 bit in DCI Format 4 that determines the resource allocation type (single-cluster or multi-cluster) for the PUSCH. If the resource allocation type can be configured by higher layers, this bit in the PDCCH could be used for encoding frequency domain positions for the SRSs when the SRS request field is non-zero. The UE would then apply the resource allocation type as indicated by higher layer signaling when the SRS request field is non-zero. When the SRS request field is zero, the bit could be used to encode the resource allocation type as originally defined for. In comparison to adding bits in the PDCCH, additional bits in the higher layer signaling is typically not an issue.

According to an aspect of the disclosure, a method of an eNodeB for configuration and reception of a transmission of SRSs on an uplink carrier of the telecommunication system is provided. The configuration includes providing configuration instructions relating to at least one shifted SRS to be created to an UE. The UE then creates at least one shifted SRS by shifting the predefined frequency domain position for at least one of said predefined SRSs in accordance with the instructions, thereby creating an extended SRS region. Then the eNodeB receives on said UL carrier at least one shifted SRS, whereby at least one additional RB can be sounded.

Those skilled in the art should understand the foregoing embodiments or part of the procedures may be implemented through programs instructing related hardware means and the program can be stored on a computer readable storage media.

Figure 4:
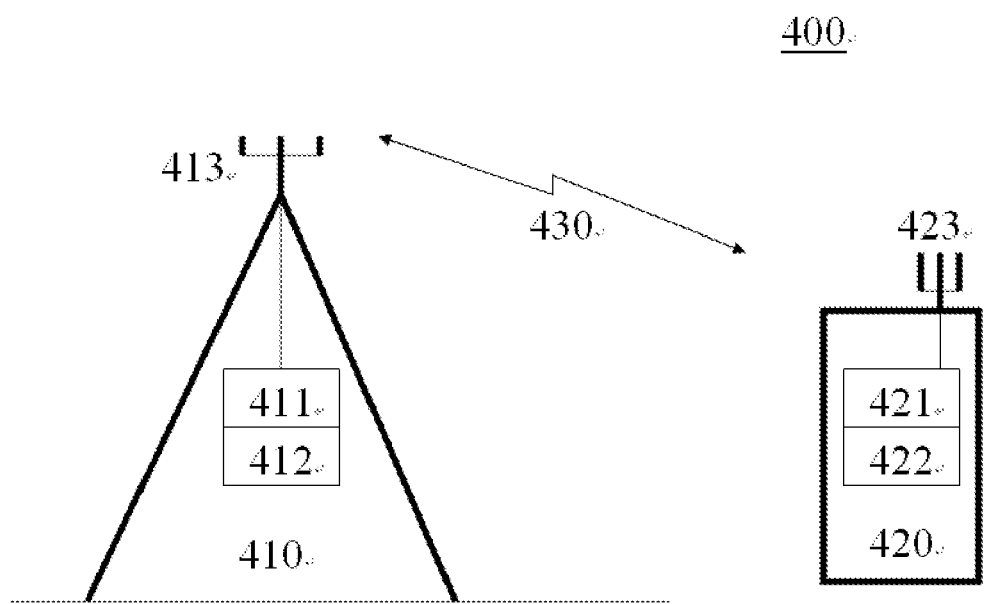
FIG. 4 shows a telecommunication system embodiment according to the disclosure.

FIG. 4 schematically illustrates a telecommunication system 400 according to an embodiment of the disclosure. The telecommunication system 400 includes at least one eNodeB 410 and at least one UE 420 communicating with each other over a radio interface 430 including UL and DL carriers.

In the eNodeB 410, the hardware means 411, being a computer, a processor, a DSP (Digital Signal Processor), an ASIC (application Specific Integrated Circuit) or the like, is connected to an antenna 413 receiving and transmitting signals over the radio interface 430. The hardware means 411 is, when being e.g. a processor, a DSP, a computer or the like, connected to a computer readable storage media 412. The computer readable storage media 412 includes ROM/RAM, soft discs, Compact Disk, etc., and is arranged for providing the hardware means 411 with instructions needed for performing the method of the disclosure, e.g. for performing the following steps of:

providing configuration instructions relating to at least one shifted SRS to be created to an UE, whereby the UE creates at least one shifted SRS by shifting the predefined frequency domain position for at least one of said predefined SRSs in accordance with the instructions, thereby creating an extended SRS region; and receiving on said UL carrier at least one shifted SRS, whereby at least one additional RB can be sounded.

In other words, according to an aspect of the disclosure, an eNodeB arranged for configuration and reception of a transmission of Sounding Reference Signals is presented. The eNodeB includes a configuration entity, arranged for providing configuration instructions to the UE in the system. These instructions are relating to creation of at least one shifted SRS by shifting the predefined frequency domain position for at least one of the predefined SRSs, thereby creating an extended SRS region including at least one additional RB being separate from the predefined SRS region. The eNodeB also includes reception entity, arranged for receiving the at least one shifted SRS on the uplink carrier.

Correspondingly, in the UE 420, the hardware means 421, being a computer, a processor, a DSP (Digital Signal Processor), an ASIC (application Specific Integrated Circuit) or the like, is connected to at least one antenna 423 receiving and transmitting signals over the radio interface 430. The hardware means 421 is, when being e.g. a processor, a DSP, a computer or the like, connected to the computer readable storage media 422. The computer readable storage media 422 includes ROM/RAM, soft discs, Compact Disk, etc., and is arranged for providing the hardware means 421 with instructions needed for performing a method of the disclosure, e.g. for performing the following steps of:

creating at least one shifted SRS by shifting the predefined frequency domain position for at least one of the predefined SRSs, thereby creating an extended SRS region including at least one additional RB being separate from the predefined SRS region;

transmitting the at least one shifted SRS on the UL carrier.

In other words, according to an embodiment of the disclosure, a UE is arranged for performing transmission of SRSs. The UE includes a shift creating entity, which is arranged for creating at least one shifted SRS by shifting the predefined frequency domain position for at least one of the predefined SRSs, thereby creating an extended SRS region including at least one additional RB being separate from the predefined SRS region. The shift creating entity can receive instructions from an eNodeB which is used in this creation. The US also includes a transmission entity, being arranged for transmitting the at least one shifted SRS on the UL carrier.

The UEs and eNodeBs of the disclosure can be adapted to perform any of the steps of the method of the disclosure involving the UE and eNodeB, respectively.

The different steps of various embodiments of the disclosure described above can be combined or performed in any suitable order. A condition for this of course, is that the requirements of a step, to be used in conjunction with another step of the method of the disclosure, must be fulfilled.

As is obvious for a skilled person, a number of other implementations, modifications, variations and/or additions can be made to the above described exemplary embodiments. It is to be understood that the disclosure includes all such other implementations, modifications, variations and/or additions which fall within the scope of the claims.

Other Embodiments

Embodiment 1. Method for transmission of sounding reference Signals (SRSs) on an uplink carrier of a telecommunication system, in which system:

a set of SRSs is predefined, each predefined SRS being configured as having a bandwidth and a frequency domain position; and a predefined SRS region includes a set of all Resource Blocks (RBs) being usable for transmission of said predefined SRSs on said uplink carrier, said set of RBs being smaller than a total set of RBs being available on said uplink carrier, the method comprising:

creating at least one shifted SRS by shifting said predefined frequency domain position for at least one of said predefined SRSs, thereby creating an extended SRS region including at least one additional RB being separate from said predefined SRS region; and transmitting said at least one shifted SRS on said uplink carrier.

Embodiment 2. Method as recited in embodiment 1, wherein
a number of RBs $m_{SRS,0}=N_{RB}^{UL}-\Delta$ being used for transmission of an SRS having a maximal bandwidth predefined for SRS in said system has a number $\Delta$ of less RBs than a number of RBs $N_{RB}^{UL}$ included in said total set of RBs being available on said uplink carrier, said number $\Delta$ being an integer higher than zero, $\Delta>0$;
up to a number $\Delta+1$ of different frequency domain positions $n_{START}=0,1,\ldots,\Delta$ for said at least one shifted SRS are defined including all feasible frequency domain positions on said uplink carrier;
utilizing one or more of said up to said number $\Delta+1$ of different frequency domain positions $n_{START}=0,1,\ldots,\Delta$ for transmission of said at least one shifted SRS.

Embodiment 3. Method as recited in embodiment 2, wherein said feasible frequency domain positions results in said extended SRS region including every one of said number $\Delta$ of RBs being unused for transmission of said predefined SRS having said maximal bandwidth.

Embodiment 4. Method as recited in embodiment 2, wherein
each RB includes a predefined number of Resource Elements (REs); and
two mutually disjoint sets of REs are usable for at least one frequency domain position of said at least one shifted SRS.

Embodiment 5. Method as recited in embodiment 4, wherein said two mutually disjoint sets are achieved by one method in the group of:
said two sets are made mutually disjoint by utilizing odd and even REs, respectively, within said extended SRS region; and
said two sets are made mutually disjoint by utilizing Time Division Multiplexing (TDM).

Embodiment 6. Method as recited in embodiment 2, wherein
each RB includes a predefined number of Resource Elements (REs); and
two different frequency domain positions are usable for said at least one shifted SRS, said two different frequency domain positions resulting in two different mutually disjoint sets of REs.

Embodiment 7. Method as recited in embodiment 1, wherein
said at least one shifted SRS includes at least one SRS having a bandwidth being smaller than a maximal bandwidth predefined for SRS in said system;
said creation of at least one shifted SRS is performed by shifting said predefined frequency domain position for at least one of said predefined SRSs having a bandwidth being smaller than said maximal bandwidth.

Embodiment 8. Method as recited in embodiment 7, wherein said extended SRS region by said creation of said at least one shifted SRS covers at least one RB being aligned with an edge RB of said total set of RBs being available on said uplink carrier.

Embodiment 9. Method as recited in embodiment 7, wherein said at least one shifted SRS includes two shifted SRSs, said two shifted SRSs being aligned with a first and a last RB, respectively, of said total set of RBs being available on said uplink carrier.

Embodiment 10. Method as recited in embodiment 7, wherein said extended SRS region includes said at least one shifted SRS having a bandwidth being smaller than said maximal bandwidth and a predefined SRS having said maximal bandwidth.

Embodiment 11. Method as recited in embodiment 1, wherein said at least one shifted SRS includes:
at least one SRS having a bandwidth being smaller than a maximal bandwidth predefined for SRS in said system; and
an SRS having a maximal bandwidth predefined for SRS in said system, whereby
said creation of at least one shifted SRS is performed by shifting said predefined frequency domain position for at least one of said predefined SRSs having a bandwidth being smaller than said maximal bandwidth and for said SRS having said maximal bandwidth.

Embodiment 12. Method as recited in embodiment 1, wherein said at least one frequency domain position being used for creating at least one shifted SRS is implicitly provided to a User Equipment (UE) in said system by utilization of one or more in the group of:
a predefined rule;
a predefined pattern of frequency domain positions; and
a system configuration.

Embodiment 13. Method as recited in embodiment 1, wherein said at least one frequency domain position being used for creating at least one shifted SRS is explicitly provided to a User Equipment (UE) in said system by use of at least one signaled parameter.

Embodiment 14. Method as recited in embodiment 13, wherein said at least one signaled parameter is an integer valued positive parameter.

Embodiment 15. Method as recited in embodiment 13, wherein said at least one signaled parameter is configured to be any one in the group of:
a UE specific parameter; and
a cell specific parameter.

Embodiment 16. Method as recited in embodiment 13, wherein said at least one signaled parameter is signaled in a Physical Downlink Control Channel (PDCCH).

Embodiment 17. Method as recited in embodiment 16, wherein said signaling reuses already existing bits in the PDCCH.

Embodiment 18. Method as recited in embodiment 17, wherein unused code points in said PDCCH are utilized for an encoding of said at least one parameter.

Embodiment 19. Method as recited in embodiment 18, wherein said utilization of said code points is achieved by at least one configuration in the group of:
a restriction of usage of at least one field in said PDCCH; and
a higher layer configuration of at least one field in said PDCCH.

Embodiment 20. Method as recited in embodiment 13, wherein a reduction of a number of SRS parameter sets is utilized for an encoding of said parameter.

Embodiment 21. Method as recited in embodiment 1, wherein said predefined set of SRSs includes all SRSs being defined in the Evolved Universal Terrestrial Radio Access (E-UTRA) of the LTE rel-10 standard.

Embodiment 22. Method as recited in embodiment 21, wherein said step of transmitting said at least one shifted SRS on said uplink carrier is performed in normal uplink subframes.

Embodiment 23. Method as recited in embodiment 1, wherein said extended SRS region includes said total set of RBs being available on said uplink carrier.

Embodiment 24. Method as recited in embodiment 1, wherein said uplink carrier only transmits a Physical Uplink Shared Channel (PUSCH), said uplink carrier being free from a Physical Uplink Control Channel (PUCCH).

Embodiment 25. Method of an eNodeB for configuration and reception of a transmission of Sounding Reference Signals (SRSs) on an uplink carrier of a telecommunication system, in which system:
- a set of SRSs is predefined, each predefined SRS being configured as having a bandwidth and a frequency domain position; and
- a predefined SRS region includes a set of all Resource Blocks (RBs) being usable for transmission of said predefined SRSs on said uplink carrier, said set of RBs being smaller than a total set of RBs being available on said uplink carrier, the method comprising:
- providing configuration instructions to an UE in said system, said instructions relating to at least one shifted SRS to be created by shifting said predefined frequency domain position for at least one of said predefined SRSs, thereby creating an extended SRS region including at least one additional RB being separate from said predefined SRS region; and
- receiving on said uplink carrier at least one shifted SRS.

Embodiment 26. Computer program, comprising code means, which when run in a computer causes the computer to execute the method according to any of the embodiments 1-25.

Embodiment 27. Computer program product including a computer readable medium and a computer program according to embodiment 26, wherein said computer program is included in the computer readable medium.

Embodiment 28. A User Equipment (UE) being arranged for performing transmission of Sounding Reference Signals (SRSs) on an uplink carrier of a telecommunication system, in which system:
- a set of SRSs is predefined, each predefined SRS being configured as having a bandwidth and a frequency domain position; and
- a predefined SRS region includes a set of all Resource Blocks (RBs) being usable for transmission of said predefined SRSs on said uplink carrier, said set of RBs being smaller than a total set of RBs being available on said uplink carrier, the UE comprising:
- a shift creating entity, being arranged for creating at least one shifted SRS by shifting said predefined frequency domain position for at least one of said predefined SRSs, thereby creating an extended SRS region including at least one additional RB being separate from said predefined SRS region; and
- a transmission entity, being arranged for transmitting said at least one shifted SRS on said uplink carrier.

Embodiment 29. An eNodeB arranged for configuration and reception of a transmission of Sounding Reference Signals (SRSs) on an uplink carrier of a telecommunication system, in which system:
- a set of SRSs is predefined, each predefined SRS being configured as having a bandwidth and a frequency domain position; and
- a predefined SRS region includes a set of all Resource Blocks (RBs) being usable for transmission of said predefined SRSs on said uplink carrier, said set of RBs being smaller than a total set of RBs being available on said uplink carrier, the eNodeB comprising:
- a configuration entity, arranged for providing configuration instructions to an UE in said system, said instructions relating to creation of at least one shifted SRS by shifting said predefined frequency domain position for at least one of said predefined SRSs, thereby creating an extended SRS region including at least one additional RB being separate from said predefined SRS region; and
- a reception entity, arranged for receiving said at least one shifted SRS on said uplink carrier.

The invention claimed is:

1. A method of facilitating transmission of a sounding reference signal (SRS) on an uplink carrier of a telecommunication system, comprising:
creating a shifted SRS, wherein a set of SRSs is predefined, each SRS from the set of SRSs having a predefined bandwidth and a predefined frequency domain position, the predefined frequency domain position including a set of resource blocks (RBs) being usable for transmission of a SRS on the uplink carrier, the set of RBs being smaller than a total set of RBs being available on the uplink carrier, and the predefined frequency domain position of a first SRS from the set of SRSs is shifted for creation of the shifted SRS, thereby creating an extended SRS region including at least one additional RB being separate from the predefined frequency domain position of the first SRS; and
transmitting the shifted SRS on the uplink carrier, and wherein a number of RBs $m_{SRS,0}=N_{RB}^{UL}-\Delta$ is usable for transmission of the first SRS on the uplink carrier, where $N_{RB}^{UL}$ is the total set of RBs being available on the uplink carrier, the number $\Delta$ being an integer greater than zero, $\Delta>0$.

2. The method of claim 1, wherein up to a number $\Delta+1$ of different frequency domain positions $n_{START}=0,1,\ldots,\Delta$ for the shifted SRS are defined including all feasible frequency domain positions on the uplink carrier, at least one of the number $\Delta+1$ of different frequency domain positions $n_{START}=0,1,\ldots,\Delta$ is utilized for transmission of the shifted SRS.

3. The method of claim 1, wherein the at least one additional RB is unused for transmission of the first SRS.

4. The method of claim 1, wherein two mutually disjoint sets of resource elements (REs) are usable for at least one frequency domain position of the shifted SRS.

5. The method of claim 4, wherein the two mutually disjoint sets are made mutually disjoint by utilizing odd and even REs, respectively, within the extended SRS region.

6. The method of claim 4, wherein the two mutually disjoint sets are made mutually disjoint by utilizing time division multiplexing (TDM).

7. The method of claim 1, wherein the shifted SRS has a bandwidth being smaller than a maximal bandwidth predefined for SRS transmission in the system.

8. The method of claim 1, wherein the first SRS has a bandwidth being smaller than a maximal bandwidth predefined for SRS transmission in the system.

9. The method of claim 1, wherein the extended SRS region covers at least one RB being aligned with an edge RB of the total set of RBs being available on the uplink carrier.

10. The method of claim 1, wherein the shifted SRS is aligned with the first RB of the total set of RBs being available on the uplink carrier.

11. The method of claim 1, wherein the shifted SRS is aligned with the last RB of the total set of RBs being available on the uplink carrier.

12. The method of claim 1, wherein the uplink carrier is free from transmission of a physical uplink control channel (PUCCH).

13. A method of facilitating transmission of a sounding reference signal (SRS) on an uplink carrier of a telecommunication system, comprising:
providing a configuration instruction to an user equipment (UE) in the telecommunication system, the configuration instruction relating to creating a shifted SRS, wherein a set of SRSs is predefined, each SRS from the set of SRSs having a predefined bandwidth and a predefined frequency domain position, the predefined frequency domain position including a set of resource blocks (RBs) being usable for transmission of a SRS on the uplink carrier, the set of RBs being smaller than a total set of RBs being available on the uplink carrier, and the predefined frequency domain position of a first SRS from the set of SRSs is shifted for creation of the shifted SRS, thereby creating an extended SRS region including at least one additional RB being separate from the predefined frequency domain position of the first SRS; and receiving the shifted SRS on the uplink carrier, and wherein a number of RBs $m_{SRS,0}=N_{RB}^{UL}-\Delta$ is usable for transmission of the first SRS on the uplink carrier, where $N_{RB}^{UL}$ is the total set of RBs being available on the uplink carrier, the number $\Delta$ being an integer greater than zero, $\Delta>0$.

14. The method of claim 13, wherein the at least one additional RB is unused for transmission of the first SRS.

15. The method of claim 13, wherein two mutually disjoint sets of resource elements (REs) are usable for at least one frequency domain position of the shifted SRS.

16. The method of claim 15, wherein the two mutually disjoint sets are made mutually disjoint by utilizing odd and even REs, respectively, within the extended SRS region.

17. The method of claim 13, wherein the extended SRS region covers at least one RB being aligned with an edge RB of the total set of RBs being available on the uplink carrier.

18. The method of claim 13, wherein the uplink carrier is free from transmission of a physical uplink control channel (PUCCH).

19. A user equipment (UE), comprising:

a shift creating entity, being arranged for creating a shifted SRS, wherein a set of SRSs is predefined, each SRS from the set of SRSs having a predefined bandwidth and a predefined frequency domain position, the predefined frequency domain position including a set of resource blocks (RBs) being usable for transmission of a SRS on a uplink carrier, the set of RBs being smaller than a total set of RBs being available on the uplink carrier, and the predefined frequency domain position of a first SRS from the set of SRSs is shifted for creation of the shifted SRS, thereby creating an extended SRS region including at least one additional RB being separate from the predefined frequency domain position of the first SRS; and a transmission entity, being arranged for transmitting the shifted SRS on the uplink carrier, and wherein a number of RBs $m_{SRS,0}=N_{RB}^{UL}-\Delta$ is usable for transmission of the first SRS on the uplink carrier, where $N_{RB}^{UL}$ is the total set of RBs being available on the uplink carrier, the number $\Delta$ being an integer greater than zero, $\Delta>0$.

* * * * *